United States Patent [19]
Perego

[11] Patent Number: 5,372,330
[45] Date of Patent: * Dec. 13, 1994

[54] MULTIPLE MODULE TAPE LOADING APPARATUS AND METHOD

[75] Inventor: Luciano Perego, Milan, Italy
[73] Assignee: Tapematic U.S.A., Inc., Orlando, Fla.
[*] Notice: The portion of the term of this patent subsequent to Jun. 30, 2009 has been disclaimed.
[21] Appl. No.: 905,740
[22] Filed: Jun. 29, 1992

Related U.S. Application Data

[63] Continuation-in-part of Ser. No. 585,395, Sep. 20, 1990, Pat. No. 5,125,587.

[30] Foreign Application Priority Data

Aug. 6, 1990 [IT] Italy .................. 21224A/90

[51] Int. Cl.⁵ .......................... B65H 18/00
[52] U.S. Cl. ...................... 242/523; 242/530
[58] Field of Search ............... 242/56 R, 56.9, 57, 242/58, 58.6, 79

[56] References Cited

U.S. PATENT DOCUMENTS

| | | | |
|---|---|---|---|
| 3,207,286 | 9/1965 | Cozzoli | 198/25 |
| 3,643,889 | 2/1972 | Krause | 242/195 |
| 4,139,165 | 2/1979 | Dyck | 242/56.9 |
| 4,175,999 | 11/1979 | Schoettle et al. | 242/56.9 |
| 4,332,355 | 6/1982 | Zopfy et al. | 242/56 R |
| 4,441,662 | 4/1984 | Seragnoli | 242/58 |
| 4,519,553 | 5/1985 | Campbell et al. | 242/56 R |
| 4,543,152 | 9/1985 | Nozaka | 242/58.2 |
| 4,572,450 | 2/1986 | Lindquist | 242/56 R |
| 4,589,811 | 5/1986 | Riccardo et al. | 242/58.6 |
| 4,629,138 | 12/1986 | Kubo | 242/56 R |
| 4,721,263 | 1/1988 | Miyazaki | 242/55 |
| 4,738,408 | 4/1988 | Odaka et al. | 242/56 R |
| 4,744,711 | 5/1988 | Heitmann et al. | 242/58.6 |
| 4,836,464 | 6/1989 | Perego | 242/56 R |
| 5,118,045 | 6/1992 | Perego | 242/56 R |
| 5,125,587 | 6/1992 | Perego | 242/56 R |

FOREIGN PATENT DOCUMENTS

| | | |
|---|---|---|
| 0281884 | 9/1988 | European Pat. Off. . |
| 2353112 | 12/1977 | France . |
| 2355355 | 1/1978 | France . |
| 2369986 | 6/1978 | France . |

*Primary Examiner*—Daniel P. Stodola
*Assistant Examiner*—John Q. Nguyen
*Attorney, Agent, or Firm*—Edgar H. Haug; Adam L. Brookman

[57] ABSTRACT

A tape loading apparatus and method comprising a supply conveyor for automatically transporting empty cassettes from a reel magazine to a plurality of independently operating loading modules wherein each module comprises at least one support hub for rotatably supporting at least one reel of use tape and a loading station designed to engage individual cassettes. Pancakes are mounted on the support hub of each module by a manipulating unit which automatically removes the out of tape pancakes from the single hubs and replaces them with new pancakes which fill individual cassettes with a predetermined amount of use tape. The manipulating unit guides the tape through a predetermined path using search and setup devices which find and thread the end of the use tape.

2 Claims, 8 Drawing Sheets

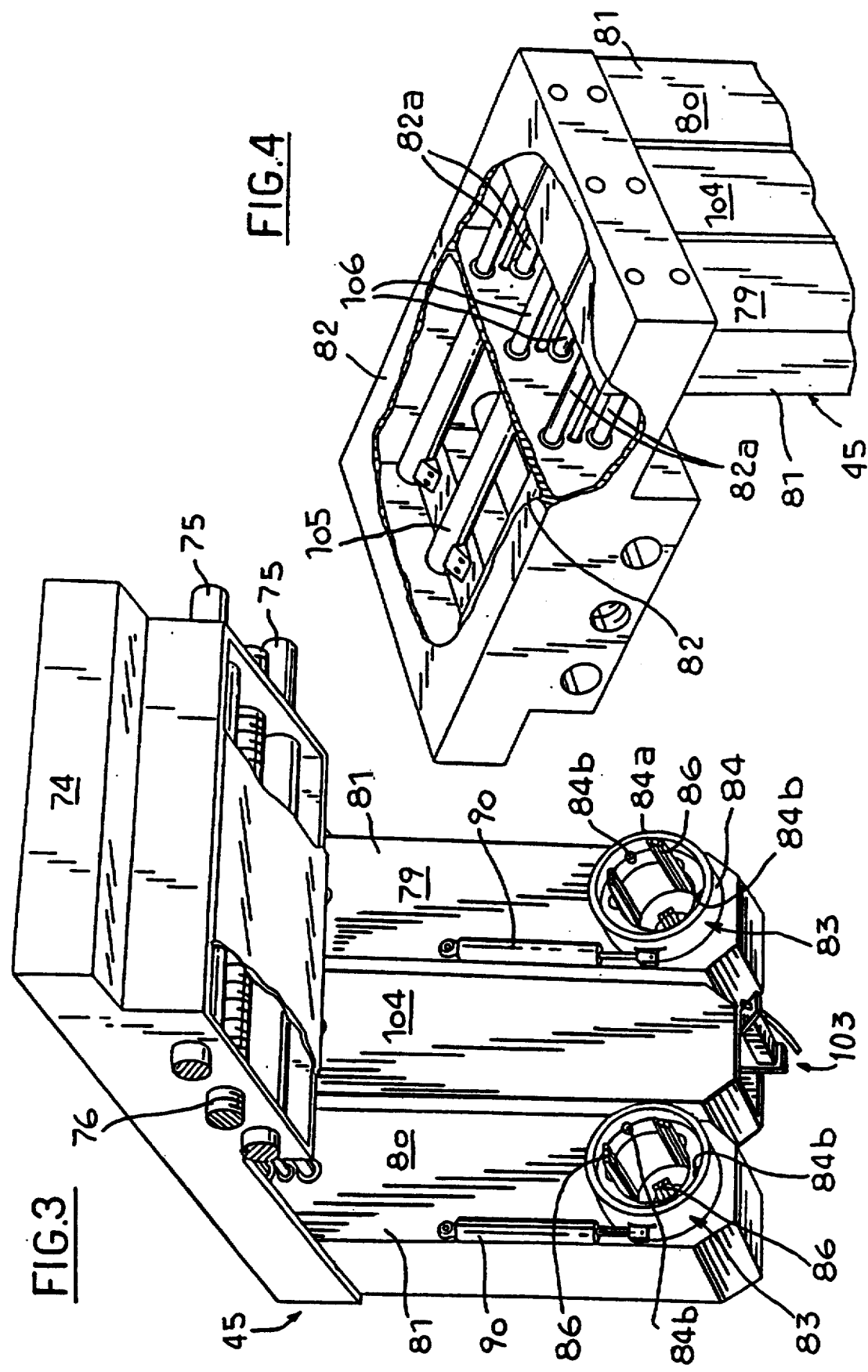

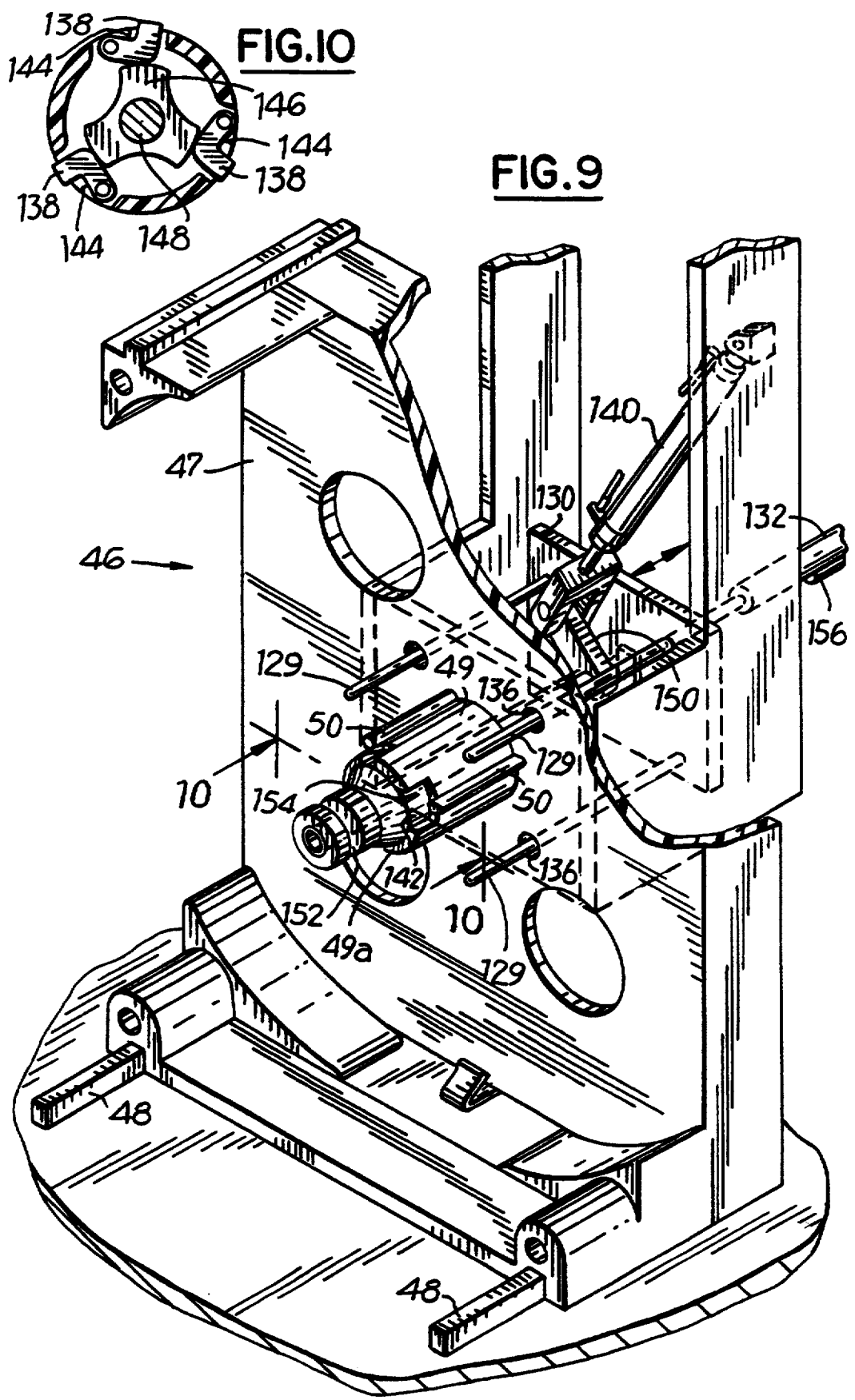

MULTIPLE MODULE TAPE LOADING APPARATUS AND METHOD

The present application is a continuation-in-part of U.S. application Ser. No. 585,395, filed Sep. 20, 1990 and now U.S. Pat. No. 5,125,587, entitled Tape Loading Center.

FIELD OF THE INVENTION

The present invention relates generally to automatic tape loading devices and methods and more specifically to an automatic tape loading machine and process which includes multiple, simultaneously operating tape loading modules and an automatic reel changing mechanism.

BACKGROUND OF THE INVENTION

The loading of tape cassettes, such as audio and/or video cassettes, is typically carried out by automatic machines in which individual cassettes are automatically fed from a supply magazine to a loading station. In the loading station, the cassettes are filled with a predetermined amount of use tape from a reel of magnetic tape ("pancake") which is detachably mounted on a support hub. (See e.g. U.S. Pat. Nos. 3,997,123, and 4,836,464). The loaded cassettes are then discharged from the loading station to a collection point.

In virtually every case, loading machines are provided with a single loading station which is interlocked or cooperates with a magazine or other mechanism for supplying the cassettes to be loaded. Therefore, if a level of productivity requiring four loading stations is desired, it is necessary to set up four discrete loading machines. This involves not only a relatively high purchase cost but also requires considerable space in a loading factory.

Notwithstanding the relatively high degree of automation achieved by previously known loading machines (See e.g. U.S. Pat. No. 5,118,045), manual intervention by an operator is still required to replace depleted pancakes on the support hub. This need for manual intervention in carrying out the above operation limits the number of machines which can be entrusted to a single operator.

SUMMARY OF THE INVENTION

An object of the present invention is to provide a high speed completely automatic tape loading apparatus and method for loading use tape into cassettes.

A further object of the invention is to provide a tape loading apparatus and method whereby the need for manual intervention during any phase of the loading operation is completed obviated.

It is still a further object of the present invention to achieve increased productivity over a series of individual loading machines while reducing bulkiness and increasing efficiency.

The objects of the present invention are achieved by an automatic machine for loading use tape into cassettes which includes a plurality of loading modules; a storage unit releasably holding a plurality of pancakes; a manipulating unit which is movable with respect to the loading modules; a grasping and release member associated with the manipulating unit designed to remove an empty pancake from one of the hubs, pick up a filled pancake from the storage unit and place it onto the support hub in place of the empty one; search means designed to find the end of the tape wound onto the new pancake mounted on the support hub; setup means adapted to engage the tape end and guide it in a predetermined path to bring it into engagement with the splicing assembly of the corresponding loading module.

BRIEF DESCRIPTION OF THE DRAWINGS

In the drawings:

FIG. 3 is a perspective view of a manipulating unit of the present invention showing only that portion which faces the front wall of the machine;

FIG. 4 is a perspective fragmentary view of the manipulating unit of the present invention showing the opposite side from that shown in FIG. 3;

FIG. 9 is a fragmentary perspective view partly in section, illustrating one embodiment of the storage unit of the present invention; and FIG. 10 is a cross sectional view of the stopper fingers of the present invention taken along line 10—10 of FIG. 9.

DETAILED DESCRIPTION

Figure 1:
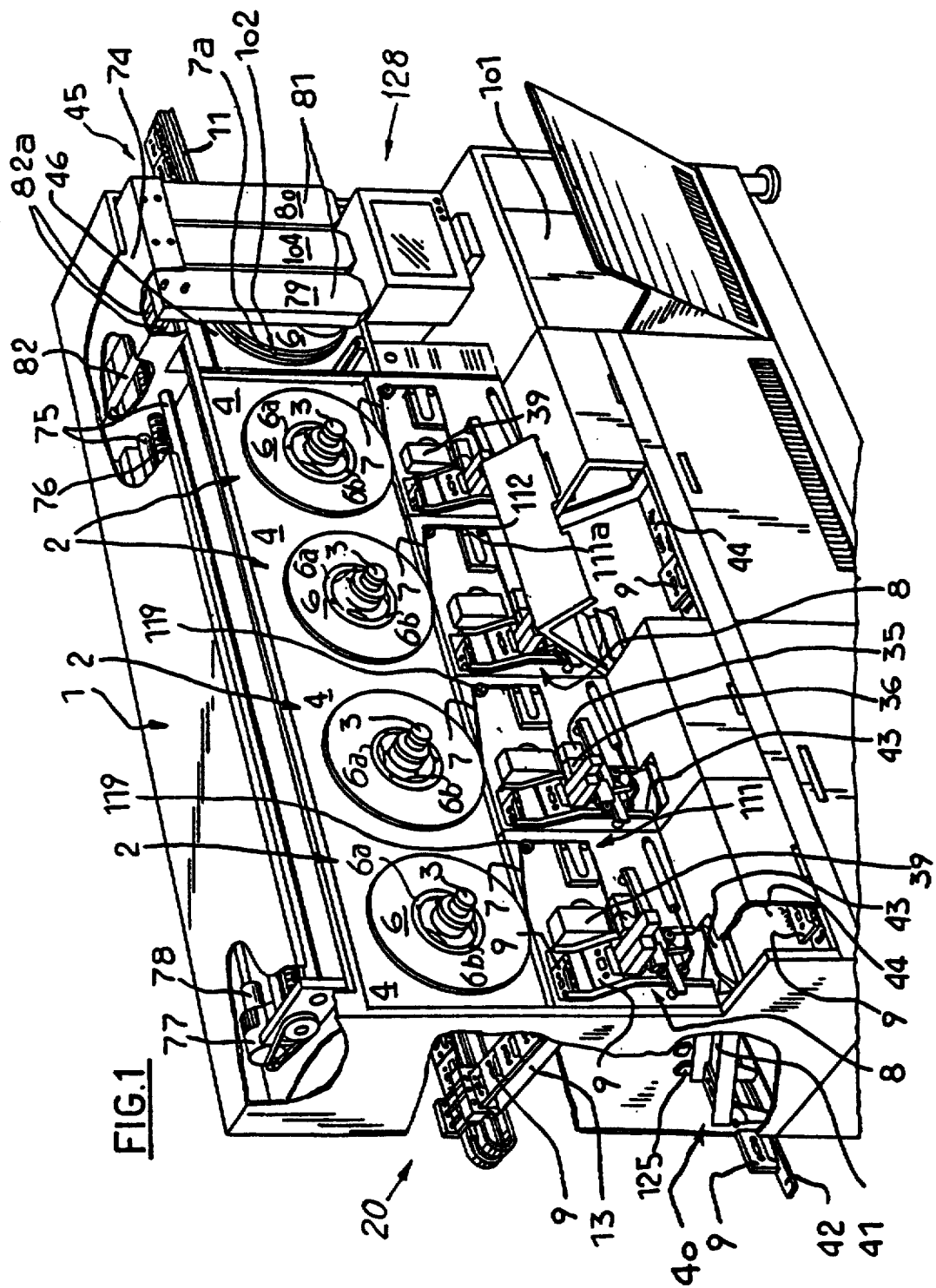
FIG. 1 is a perspective view of the apparatus of the present invention.

Referring to FIG. 1, a cassette loading machine constructed in accordance with one embodiment of the present invention is generally designated with reference numeral 1.

The loading machine comprises a plurality of removable loading modules 2 disposed consecutively in side-by-side relation. Each module is associated with at least one support hub 3 mounted on a front wall portion 4 of the loading machine 1 and capable of rotation via a corresponding motor 5 (See FIG. 8). Each support hub 3 removably engages pancakes 6 on which the use tape 7 is wound. From the pancake, the tape follows a predetermined path between different components of the respective loading module to reach a splicing assembly 120. Thereafter the use tape is spliced to the leader tape from each cassette 9 and wound into the cassette. The cassettes are fed, one at a time, via an in-feed conveyor 13, to a loading station 8 adjacent the splicing assembly 120. The in-feed conveyor 13, may be replaced by an inclined delivery chute (not shown) if less precise transportation of cassette is permissible.

The supply means 10 preferably comprises a supply conveyor 11 on which the cassettes 9 to be loaded are transported to the vicinity of the in-feed conveyors 13. A stop partition 12 is preferably mounted to one side of the loading machine 1 on the end of the conveyor 11. Thus, each cassette 9 is preferably moved towards the stop partition 12, by movement of the conveyor 11, until it is stopped against the partition 12 or against the immediately preceding cassette. If the conveyor 11 is completely filled with cassettes 9, it can be temporarily deactivated either automatically or manually.

The in-feed conveyors 13, each extending from the supply conveyor 11 to the vicinity of one of the loading stations 8, comprise a further portion of the supply means 20. While only one in-feed conveyor 13 is shown FIG. 1, an identical conveyor 13 is associated with each loading module 2.

Preferably associated with each in-feed conveyor 13 is a pusher element 14 capable of operatively engaging one of the cassettes 9 carried by the supply conveyor 11 to transfer a cassette to the in-feed conveyor 13. (If the cassettes are transported on the supply conveyor in a vertical orientation, a blower or other transfer means may be substituted for the pusher element 14. If, alternatively, the cassettes are transported on a plurality of spaced apart belts, a pick-up arm as shown and described in U.S. Pat. No. 5,118,045 may be employed.) As shown in FIG. 1, the pusher element 14 is fastened to one end of a rod 15a belonging to a fluid-operated actuator 15 and guided by two slide rods 122 so that it moves longitudinally toward the in-feed conveyor 13. Once on the in-feed conveyor 13 the cassettes 9 are urged against a pair of front shoulders 16a (see FIG. 2) associated with a pair of feed guideways 16 by the movement of the conveyor 13.

Figure 2:
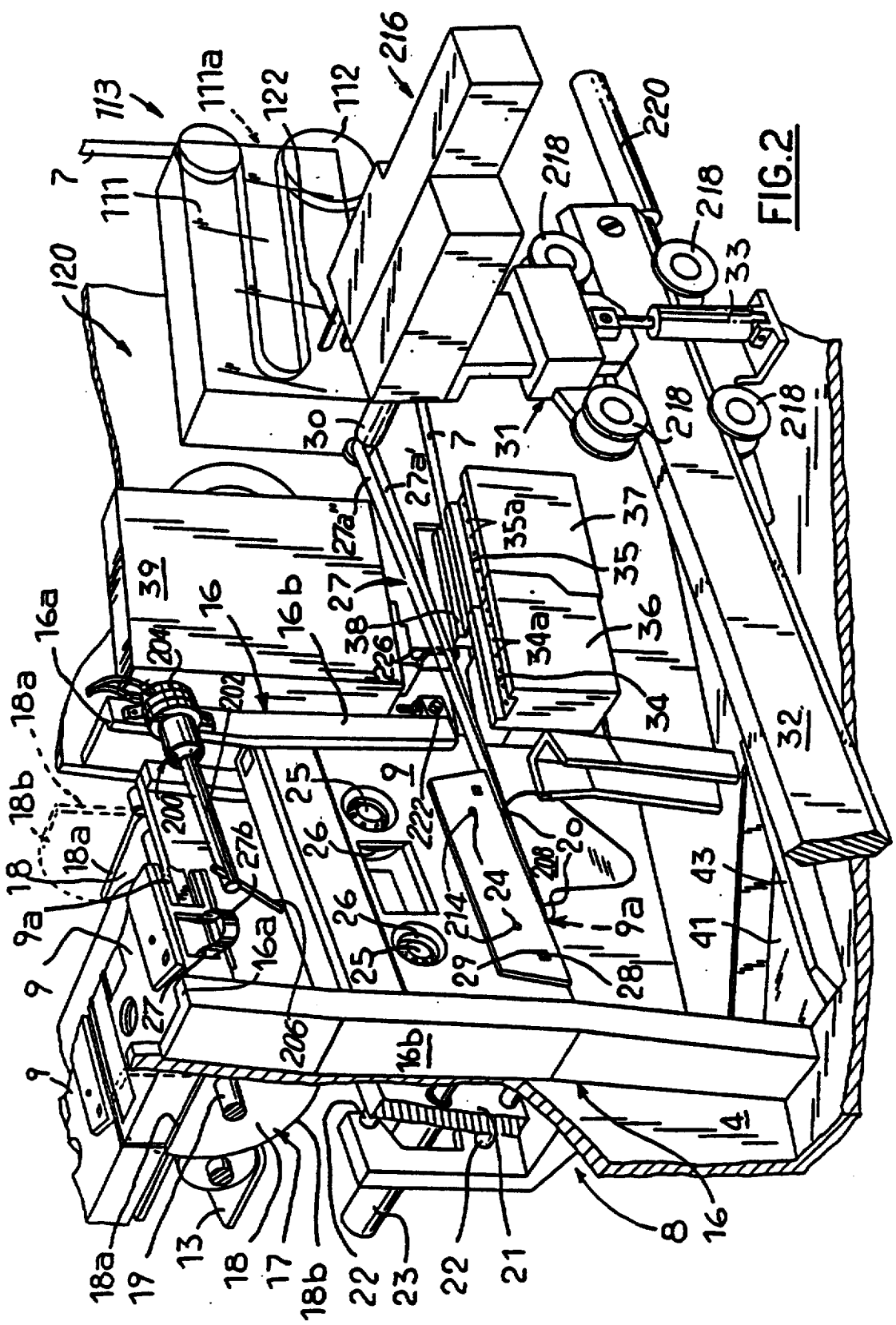
FIG. 2 is a perspective view of a loading station of the present invention showing the leader extracted from a cassette, before the cassette loading operation begins.

As shown in FIG. 2, a rotating extractor pick 200 is preferably mounted on one of the guideways 16. The extractor pick 200 comprises an arm 202 operatively connected to a pneumatically operated rotary switch 204. A long pin 206 is slidably mounted in the arm 202 toward the arm's distal end. As the extractor pick 200 is rotated through an arc, it passes slightly between the bottom flanges of the front-most cassette 9 on the in-feed conveyor 13 to engage the leader tape 27 and extract it from the cassette housing in the form of a loop 27b.

A rotating member 17 acts between each in-feed conveyor 13 and the feed guides 16 to transfer the individual cassettes 9 from the conveyor to the loading station 8. As shown in FIG. 2, the rotating member 17 essentially comprises a pair of elements in the form of sectors of a circle 18 fastened to a drive shaft 19. The member 17 is rotated about the horizontal axis of the drive shaft 19 from a first position in which its rectilinear edges 18a are in coplanar alignment with the in-feed conveyor 13, to an operating position in which, by rotation through approximately 90°, the rectilinear edges are disposed substantially in alignment with the guideways 16 to drop the cassette 9 down along the guideways 16.

The sector-shaped elements 18 also have curved edges 18b adapted to offer, in the operating position, an abutment seat for the subsequent cassette 9 to prevent interference with the cassette being rotated into alignment with the guideways 16.

The cassettes 9, when aligned within the guideways 16, fall down until they meet a pair of stop pegs 20. The stop pegs 20 are mounted on a first movable plate 208 which moves between a first position substantially flush with the front wall 4 and a second position behind the front wall 4. The plate 208 is slidably mounted on a guide member and is moved between its two positions by a fluid operated actuator.

When a cassette 9 is at rest and supported in the loading station 8 by the stop pegs 20, it is more precisely positioned by a pair of centering pins 214, which fit into holes 24 in the cassette housing and are connected to a second movable plate 21. The plate 21, which is slidably mounted on guide members 22 which are secured to the rear of the front wall 4, is moved close to and away from the front wall 4 upon command of one or more fluid-operated actuators 23. This brings the plate 21 from a first rest position to a second operating position in which the centering pins 214 fit into the locator holes 24.

The movable plate 21 also carries one winding spindle 25 which engages the left hub 26 in the cassettes 9. (In FIG. 2, for illustrative purposed only, plate 21 is shown in its first, rest position, while the pins 214 are shown as if the plate 21 was in its second, operating position.)

As discussed previously, a short portion of the leader 27 is extracted from the opening 9a of the cassette 9 by the action of the extractor pick 200 in the form of a loop 27b. When the cassette 9 is settled in the loading station 8, the leader loop is entered transversely by a bidirectionally movable pin 30 which is part of positioning-/windoff assembly 216. The positioning/windoff assembly 216 is mounted on a transport 31 which moves along a slide 32 on a plurality of opposed wheels 218. The transport 31 is shifted sideways relative to the cassette 9 by an actuator 220. This causes an additional length of leader 27a to be pulled from the cassette 9. Once the leader has been pulled out sufficiently (i.e. past the splicing blocks 36 and 37), the positioning/windoff assembly 216 is lowered by a fluid-operated actuator 33, such that the pin 30 pulls the leader down below the surface of the blocks 36 and 37. This positively positions the leader 27a into aligned tracks 34 and 35 on first and second splicing blocks 36 and 37. The leader 27a portion is then held in the tracks 34 and 35 by suction produced through the holes 34a and 35a in the track bottoms. The positioning/windoff assembly 216 is returned to its original, raised position by actuator 33 thereby physically separating the top and bottom leader portions 27a' and 27a'' and bringing the top portion of the leader 27a'' into contact with a leader holder 222. The leader holder 222 holds the top portion of the leader 27a'' in a groove (not shown) by suction applied through holes (not shown). The pin 30 then retracts and the transport 31 returns to its starting position, in front of the loading station 8.

The splicing blocks 36 and 37 both shift inwardly to a new plane to bring them into alignment with the splicer mechanism 39 and adjacent to the cutter 226. The leader 27 is cut into two pieces by the cutter 226 as the cutter moves transversely between the blocks 36 and 37.

At this point, block 37 is shifted relative to block 36, in order to bring track 38 (holding the leading end of the use tape 7 coming from the pancake 6) into alignment with track 34. The splicer 39 is then operated to place a length of splicing tape from reel 162 on the leading edge of use tape 7 and the leading edge of leader portion 27a in track 34 to join ("splice") them together. After the two tape portions have been spliced together, blocks 36 and 37 are again moved away from the front wall 4, back to the original plane, and the winding spindle 25 is operated to wind a predetermined amount of the use tape 7 onto the hub 26 of the cassette 9. When the winding is complete, the blocks 36 and 37 are again simultaneous moved backward towards the front wall 4 to allow the cutter 226 to cut the use tape 7 between the blocks 36 and 37. Block 37 is thereafter moved to bring track 35, having the leader portion 27a therein, into alignment with the use tape 7 in track 34 of block 36 to permit the splicing unit 39 to be operated to splice the two tape pieces together. The winding spindle 25 is then operated to wind the joined use tape 7 and the leader tape 27 into the cassette 9.

A properly loaded cassette 9 is released from the loading station 8 and is directed to discharge means 40 (FIG. 1) which automatically moves it out and away from the loading module 2.

In greater detail, a cassette 9 is released from the loading station 8 as plate 21 moves backward. The cassette 9 falls downward, under the influence of gravity, toward a deflector plate 43. When the deflector plate 43 is in a first position it directs the cassette 9 to an out-feed chute 41 or out-feed conveyor (not shown) disposed underneath the corresponding loading station 8. The chute 41 terminates at a discharge conveyor 42 at the back of the machine 1. When the deflection plate 43 is in a second operating position, for cassettes that are found to be defective or were not properly loaded, the cassettes 9 are dropped down into a scrap receptacle 44 located under the loading modules 2.

The conveyor 42 preferably includes at least two tracks 230 and 232 for transporting loaded cassettes to a plurality of locations. The transfer mechanism 234, which transfers cassettes from the discharge chute 41 to the conveyor 42, is preferably movable on slides 236, via an actuator 238, between a plurality of positions to permit the transfer of cassettes 9 to any of the conveyor tracks 230 or 232. This mechanism 234, which is operatively connected to sensors 228 and 242, preferably includes a rotating member 240 which reorients the cassettes 9 from a substantially horizontal position to a substantially vertical position in which they are carried away by the discharge conveyor 42.

In order to prevent the cassettes 9 discharged from one of the loading modules 2 from falling onto cassettes 9 discharged from other loading modules 2 located upstream, sensors 228 and 242 are preferably provided. Sensors 228 are located at a point immediately upstream of each out-feed chute 41 adjacent the conveyor 42, while sensors 242 are located on each corresponding transfer mechanism 234. The sensors 242 indicate when a cassette has reached the transfer mechanism 234 and is ready to be discharged. The sensors 228 indicate when the conveyor 42 is clear and permit cassettes 9 to be released by the transfer mechanism 234 without interference.

It should be understood that the operations concerning the feeding of individual cassettes 9 to the loading station 8, the loading of the cassettes 9 with the desired amount of use tape 7 and the transferring of the loaded cassettes to the out-feed conveyor 42, have been described above with reference to a single loading module 2. However, those operations take place in an identical manner in all loading modules 2 provided in the cassette loading machine 1.

In accordance with the present invention, the loading machine 1 further comprises a manipulating unit 45 which is operated each time one of the pancakes 6´ mounted on one of the support hubs 3 has insufficient use tape 7 left to fully load a cassette. At that time, the manipulating unit 45 automatically replaces the empty pancake 6 with a new pancake 6.

Figure 6:
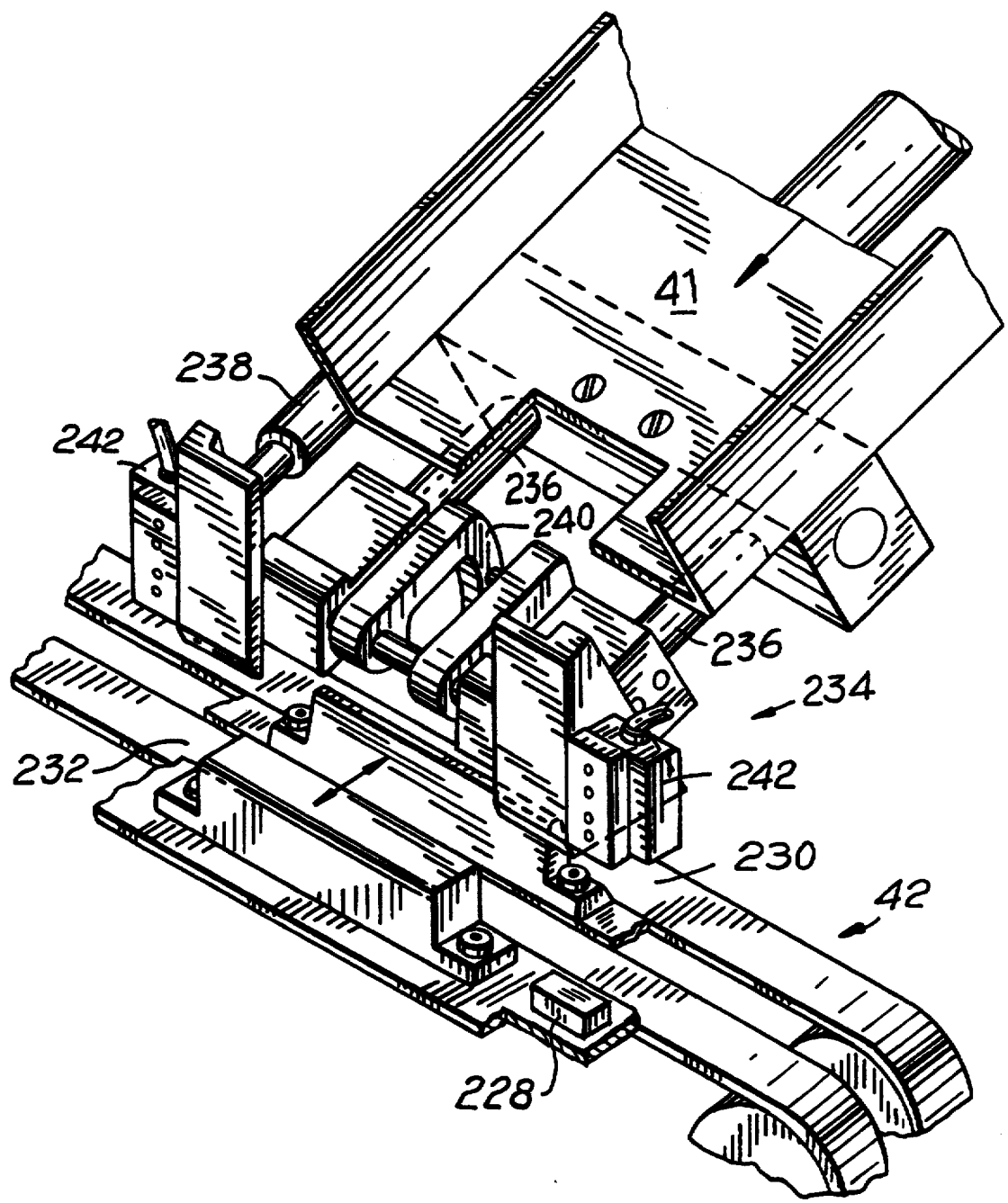
FIG. 6 is a perspective view of one embodiment of the discharge conveyor and out-feed transfer mechanism of the present invention.

Referring to FIG. 6, a storage unit or pancake magazine 46, comprising a support framework 47, is detachably mounted on slide rails 48 which are affixed to the loading machine 1. The support framework 47 comprises a guide sleeve 49 on which pancakes 6 filled with use tape 7 are slidably engaged. Longitudinally extending on the guide sleeve 49 are guide members 50 which correspond to slots 6b on the pancakes' hubs 6a. This prevents the pancakes 6 from rotating (although they can still slide axially on the sleeve 49).

When the magazine 46 is mounted on the loading machine 1, the pancakes 6 are pushed toward the front end 49a of the sleeve 49 by a plurality of pins 129 which extend through holes 136 in the framework 47. The pins 129, which extend, in cantilever fashion, from a movable plate 130, push against the central hub 6a, of the rearmost pancake on the sleeve 49. The movable plate 130 is, in turn, driven by an actuator 132 and guided by two guide rods 134. (A switch 158, which is activated by a framework 47 when it is slid into position along the slide rails, sends a signal to the microprocessor 128 to activate actuator 132.)

A plurality of stopper fingers 138 hold the pancakes 6 on the guide sleeve 49 against the action of the pins 129. In the example shown, three stopper finger 138 are provided which are circumferentially distributed at approximately 120° from each other about the axis of the sleeve 49.

Stopper fingers 138 are pivotally mounted within a second guide sleeve 142 which fits within the first sleeve 49 virtue of its smaller outer diameter. The stopper fingers 138, which are each spring biased by a spring 144 to a first, retracted position, are moved to a second, raised position, by a cam 146. A shaft 148, to which the cam 146 is affixed, rotates the cam 146, and consequently the stopper fingers 138, between their first and second positions. The shaft 148 has a lever arm 150 affixed to its distal end which is, in turn, connected to the actuator 140. The lever arm 150, moved by the actuator 140, ultimately moves the stopper fingers 138 between their first and second positions.

Figure 8:
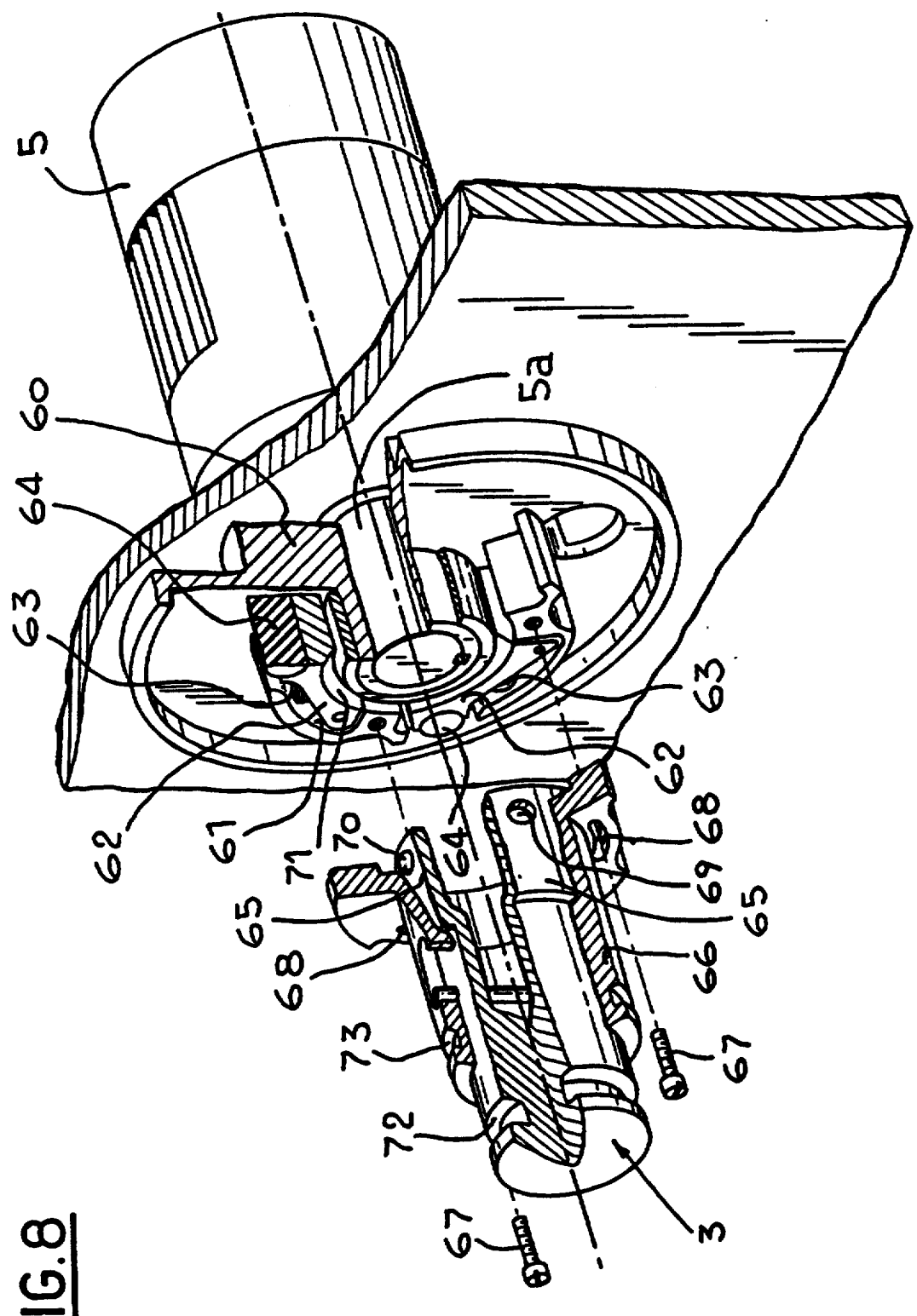
FIG. 8 is an exploded perspective view of one of the support hubs provided in the loading machine of the present invention.

In the cassette loading machine of the present invention each support hub 3 comprises a core 60 connected to a shaft 5a of a drive motor 5 (see FIG. 8). Pivotably mounted on the core 60, in the region of housings 61, are three locking levers 62 circumferentially distributed at approximately 120° from one another about the axis of the core 60. The locking levers 62 are each urged against the axis by a compression spring 63. A retention element 64, preferably made of elastomeric material, is located at one end of each locking lever 62. The locking elements 64 exert a thrust action against the slots 6b in the pancake's hub 6a to fix the pancake 6 on the support hub 3.

Associated with the core 60 is a slidable actuator collar 65 held against rotation with respect to a guide collar 66. The actuator collar 65 is attached to the core 60 by threaded elements 67 which extend through curved slots 68 in the guide collar. The actuator collar 65 carries three balls 70 distributed at approximately 120° about the axis of hub 3 and accommodated in radial holes 69. Each of the balls acts on an inclined surface 71 formed along the front edge of one of the locking levers 62. The action of the balls 70 on the inclined surfaces 71 opposes the force supplied by compression springs 63 to cause the simultaneous moving of levers 62 away from the axis of the support hub 3 when the actuator collar 64 is moved towards the front wall 4.

The actuator collar 65 and guide collar 66 are also provided with circumferential grooves 72, 73 close to their respective free ends. The grooves are capable of being engaged by a drive means 93 adapted to cause the axial movement of the actuator collar 65.

Referring to FIGS. 3 and 4, the manipulating unit 45 comprises a main carriage slidably mounted on guide bars 75 which extend horizontally on top of the cassette loading machine 1. The main carriage 74 is movable across the front of the machine upon command of a threaded rod 76 which is parallel to the guide bars 75 and rotatably driven by a driving motor 77 controlled by an encoder 78. The encoder 78 is in communication with the microprocessor 128 which manages the operation of the entire cassette loading machine 1.

Preferably associated with the main carriage 74 are two discharge/supply devices 79 and 80. These devices are capable of: removing empty pancake hubs 126 from any support hub 3; picking up new pancakes 6 filled with use tape 7 from the storage unit 46; and placing each new pancake on any hub 3. All of these operations could be accomplished with only one discharge/supply device if space or cost so dictated. However, the use of two such devices decreases the time necessary to replace a pancake.

Each discharge/supply device 79 or 80 comprises a support arm 81 extending vertically from the main carriage 74 which is movable in and out from the face of the machine 1 along transverse guide members 82a via a fluid-operated drive actuator 82 fastened to the main carriage.

Connected to the lower end of each of the support arms 81 is a grasping and release member 83 which can operatively engage the support hub 3 and the storage unit 46 to pick up and discharge new pancakes and empty hubs.

Figure 7:
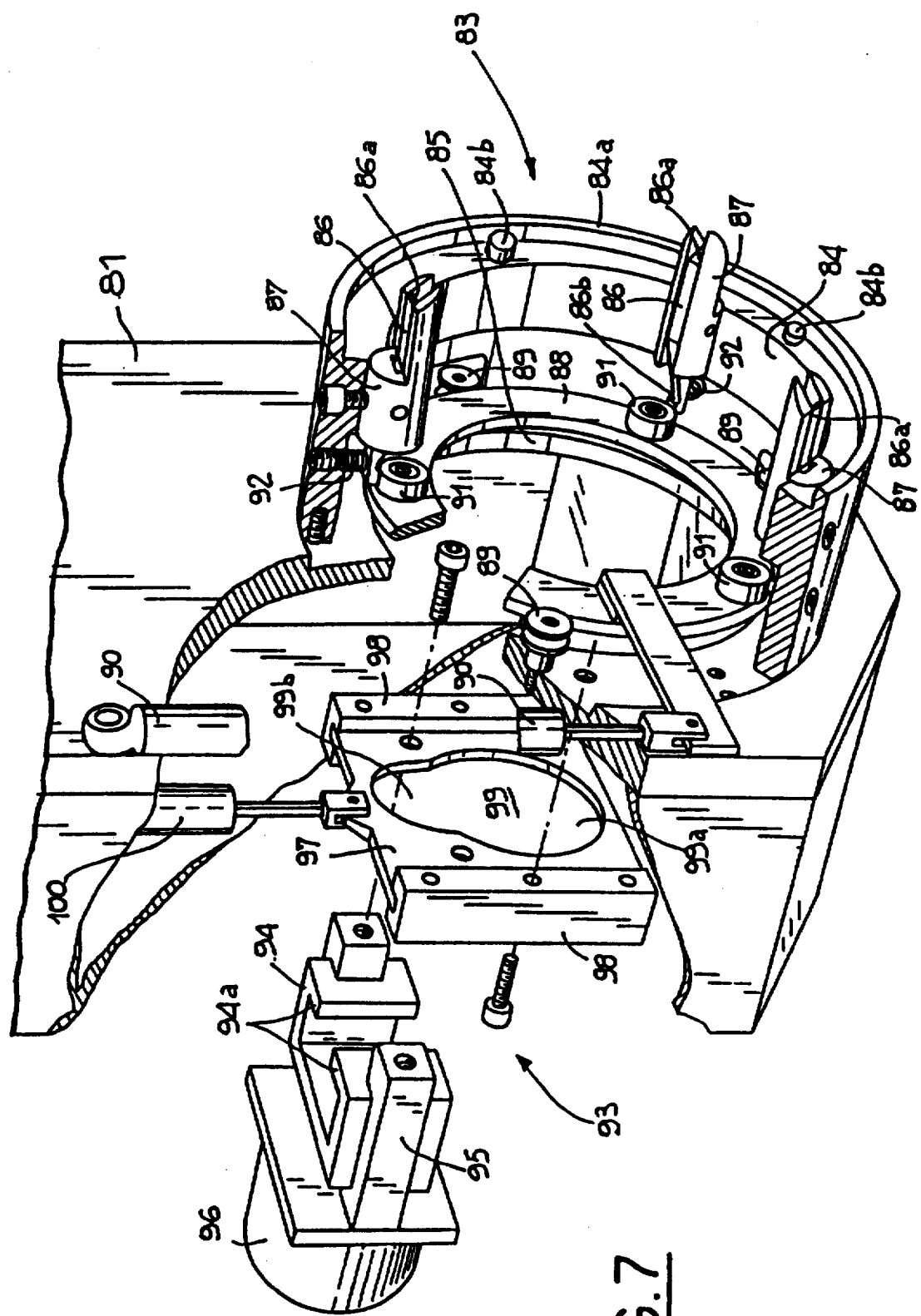
FIG. 7 is an exploded fragmentary view, in perspective, of a gripping member of the present invention which is associated with the manipulating unit shown in FIG. 3.

Referring particularly to FIG. 7, each of the grasping and release members 83 comprises a support collar 84 fastened to the support arm 81. The support collar 84 operatively engages the support hub 3 and/or the storage unit 46 when the corresponding support arm 81 is moved toward the front wall 4.

The support collar 84 has a front edge 84a designed to offer a bearing seat for the individual pancakes 6 taken from the storage unit 46 or the support hub 3. Connected to the support collar 84 are at least three gripping levers 86, preferably circumferentially distributed at approximately 120° from one another. Each gripping lever 86 is pivotably linked to the inner part of a guide block 87 fastened to a seat formed in the support collar 84. Each gripping lever 86 further has one end 86a projecting out from the support collar 84 which is fitted into the central opening of the hub 6a of the pancake 6 when the pancake is picked up from the storage unit 46 or from the support hub 3.

An actuator ring 88 is rotatably supported by a plurality of guide rollers connected to the support arm 81 and circumferentially distributed about an access opening 85. The actuator ring 88 is operable in rotation through a predetermined angle upon command of a fluid-operated cylinder 90 secured to the arm 81. The ring 88 includes a plurality of projections 91, preferably consisting of thrust rollers rotatably mounted on the ring itself and distributed at 120° from one another, The thrust rollers 91 act on the ends 86b of the gripping levers 86 to simultaneously move the levers 86, against the action of return springs 92, from a gripping condition in which the first ends 86a are radially spaced apart from the axis of the support collar 84 to a release condition in which the ends 86a are moved close to the axis of the support collar 84.

Also associated with each grasping and release member 83 is a drive means 93 designed to selectively act on the actuator collar 65 of each support hub 3. This causes the axial. movement of the collar 65 to carry out the engagement and disengagement of new pancakes 6 from the hubs 3.

The drive means 93 comprises a hooking element 94 provided with two opposed hooking portions 94a. The hooking element 94 is slidably engaged on a guide block 95 and is movable upon command of an actuator 96 secured to the guide block 85.

The guide block 95 is secured to a plate-like element 97 set between a pair of guide members 98 fastened to the inside of the arm 81. Preferably the plate-like element 97 is provided with a shaped opening 99 having an insertion portion 99a larger in width than the diameter of the second guide sleeve 142 belonging to the storage unit 46, as well as the guide collar 66 belonging to the individual support hubs 3. Aligned with the insertion portion 99a is a fitting portion 99b which is smaller in width than the insertion portion 99a. The fitting portion 99b is adapted to operatively engage the circumferential grooves 152 and 73 formed on the guide sleeve 142 and the guide collar 66 of the pancake magazine 46 and hub 3, respectively.

An actuator 100, secured to the support arm 81, acts on the plate-like element 97 to radially move it along with the hooking element 94. More specifically, following the operation of the radial-movement actuator 100, the hooking element 94 is moved from a rest position in which it is radially spaced apart from the axis of the support collar 84 to an operating position in which it is in coaxial alignment with the axis of the support collar. At the same time, the plate-like element 97 is moved from the rest position, in which the insertion portion 99a of the shaped opening 99 is in coaxial alignment with the axis of the support collar 84, to an operating position in which the fitting portion 99b of the shaped opening 99b is coaxially aligned with the axis of the collar.

During the normal running of the cassette loading machine 1, the manipulating unit 45 is preferably positioned in front of the storage unit 46 with one of the pancakes 6 filled with use tape 7 engaged on support arm 81.

In operation, the grasping and release member 83 associated with the discharge/supply device 79 or 80 is brought into coaxial alignment, through the movement of the main carriage 74, with the storage unit 46. Upon command of the fluid-operated actuator 90, the actuator ring 88 is rotated through an angle thereby causing the thrust rollers 91 to move the gripping levers 86 to the release position. Subsequently, the support arm 81 of the discharge/supply module 79 or 80 is brought to its operating position such that the grasping and release member 83 engages the second guide sleeve 142, bringing the front edge of the support collar 84 close to the first pancake 6 mounted on the first guide sleeve 49. During this step the second guide sleeve 49 is introduced into the insertion portion 99a of the shaped opening 99. This brings the circumferential groove 58 of the second guide sleeve 49 into radial alignment with the plate-like element 97. Simultaneously, the centering projections 87a of the guide blocks 87 enter spaces 154 suitably arranged on the first guide sleeve 49, at positions adjacent to the openings 6b in the pancakes 6. This puts the gripping levers 86 into position to engage the front pancake 6 on the guide sleeve 49.

At this point the radial-movement actuator 100 is driven forward causing the shifting of the plate-like element 97 to its operating position. In this situation, the edges of the fitting portion 99b of the plate-like element 97 come into engagement with the circumferential groove 58 exhibited by second guide sleeve 142 of the storage unit 46.

Following the engagement of the groove 58 by the plate-like element 99, the stopper pins 138 are returned to their first, rest position by virtue of the movement of actuator 140 and corresponding rotation of shaft 148 and cam 146. Thereafter, actuator 132 is activated to push the pancakes 6 on the guide sleeve 49, via the pins 129, forward toward the front edge of the support collar 84. At this point, a pancake 6 leaves the first guide sleeve 142 to abut the front edge of the support collar 84.

The fluid-operated cylinder 90 is then deactivated and the return springs 92 bring the gripping levers 86 back to their gripping position to enable them to hook the front most pancake 6 at the edges of its central hub 6a.

Then the radial-movement actuator 100 brings the plate-like element 97, and as a result the hooking element 99b, back to the rest position. This permits the support arm 81 to return to its rest position upon command of the actuator 82.

Simultaneously with, or just after, the withdrawal of the support arm 81 from its working position, actuator 140 is deactivated to bring the stopper pins 138 back to their hold back position and the actuator 132 is activated to cause the pins 129 to push the remaining full pancakes against the stopper pins 138. If the magazine 46 is empty (i.e. the last pancake 6 has been removed), the actuator 132 will make a full, unimpeded stroke. When this occurs, a sensor 156, operatively associated with the actuator 132, will indicate to the machine that no further pancakes are available. Thereafter, the machine will alert the operator (via an audio or visual signal) or an automatic device to replace the framework 47 with a new, fully loaded one.

When a pancake 6, mounted on one of the support hubs 3, is detected to be out of use tape 7 (or has insufficient tape 7 to fill a cassette), the manipulating unit 45 is brought in front of the out of tape loading module 2 by the movement of the main carriage 74. (If there is an insufficient amount of tape 7 remaining on the reel to fill a cassette 9, the windoff/positioning assembly 216 is operated to wind off the remaining tape as scrap.) The empty hub 6a to be replaced is removed from the support hub 3 by the grasping and release member 83 associated with the supply/discharge device 79 or 80 which, acts on the actuator collar 65 to move it axially apart from the front wall 4. The locking levers 62 are then urged, upon the action of the compression springs 63, towards the axis of the support hub 3 thereby disengaging the hub 6a as the support arm 81 is moved away from the front wall 4.

The empty hub 6a of the pancake 6, held by the supply/discharge device 79 or 80, is expelled onto a receptor arm 164 located near the storage unit 46 as the manipulating unit 45 is brought back toward the storage unit 46. The expulsion of the hub 6a takes place after the gripping levers 86 have been retracted to the release position, upon the action of one or more spring loaded thrust pins 86b mounted in the support collar 84.

As shown in FIG. 1, each pancake 6 located in the pancake magazine 46 has a free end 7a oriented outwardly. When the pancake 6 has been mounted on a support hub 3, the corresponding free end 7a can be located at any point on the circumferential edge of the pancake 6. It is, however, necessary that the free end 7a be disposed in a predetermined position to permit it to be operatively engaged by the tape loading machine 1.

In order to dispose the free end 7a in the desired position, a search means is employed. The search means comprises a reading member 103 (See FIG. 5) fastened to an additional support arm 104 extending vertically from the main carriage 74 and preferably located between the support arms associated with the two supply/discharge devices 79 and 80. The additional support arm 104 is also movable upon command of a fluid-operated actuator 105 along transverse guide bars 106. This moves the reading member 103 from a rest position, in which it is axially spaced apart from the pancakes 6 (so that it does not interfere with the support hubs 3 when the main carriage 74 is moved), to an operating position.

Preferably, the reading member 103 comprises a two channel fiber sensor 107 designed to emit a light beam shown in dotted lines and referenced by "L". The beam "L" is reflected back toward the fiber sensor by a reflector 158 preferably mounted on an inclined block 160 mounted on the front wall 4 of the machine 1. (The fiber sensor's first channel sends the light beam "L" and the second channel collects any reflected light). The sensor 107 is suitably inclined (preferably in the range of 30° to 60° and is ideally equal to 45°), relative to the axis of the pancake 6, to emit the light beam "L" which will be broken by a free end portion 7a. The angle of inclination of the light beam "L" relative to the axis of the pancake 6 preferably is in the range of 30° to 60° and is ideally equal to 45°.

After the new pancake 6, is mounted on a support hub 3 by means of a supply/discharge module 79 or 80, the support arm 81 is moved toward the pancake 6, so that the reading member 103 is in its working position.

The main carriage 74 is moved along the guide bars 75 under the control of encoder 78 so that the reading member 103 moves across the pancake 6. When the reading member 103 first gets a reflection from the reflector 158 the peripheral edge of the reel 6 is located. The reading member 103 is then stopped at a predetermined distance spaced apart from the pancake 6 in front of the reflector 158.

At this point, the support arm 81, is moved back a predetermined distance, closer to the pancake 6, in order to bring the reading member 103 to a position adjacent the peripheral edge of the reel 6 in which it can detect the free end portion 7a.

The reel 6 is then rotated to bring the free end portion 7a into a position to be detected by the reading member 103. As soon as the light beam "L" is broken by the free end portion 7a, the reading member 103 generates a signal to a microprocessor 128 to indicate the need to stop the rotation of the pancake 6. The microprocessor then signals the motor 5 which drives the corresponding support hub 3 to stop the pancake's rotation. The pancake 6 is then immediately rotated in the opposite direction at a slow speed. the rotation of the pancake 6 is stopped either after the free end 7a is rotated a predetermined distance or after the free end portion 7a breaks the beam "L" a second time. The free end portion 7a is thus disposed in a predetermined position.

The main carriage 74 is then moved further toward the pancake 6, a predetermined distance, to bring the grasping member 115 into position to engage the free end portion 7a. A further movement of the main carriage 74, to the right or left, may be necessary to complete the engagement positioning of the grasping member 115 depending upon its location vis-a-vis the reading member 103. The setup means 110 then threads the use tape 7 between different components of the corresponding loading module 2.

In greater detail, the use tape 7 first passes before a vacuum column (control unit) 111 used to synchronize the motor associated with the support hub 3 and the motor associated with winding spindle 25. In addition, the use tape 7 passes over a counter wheel 112 which measures the amount of use tape which is wound into each cassette 9. Finally, the use tape must be placed on the splicing block 37.

Figure 5:
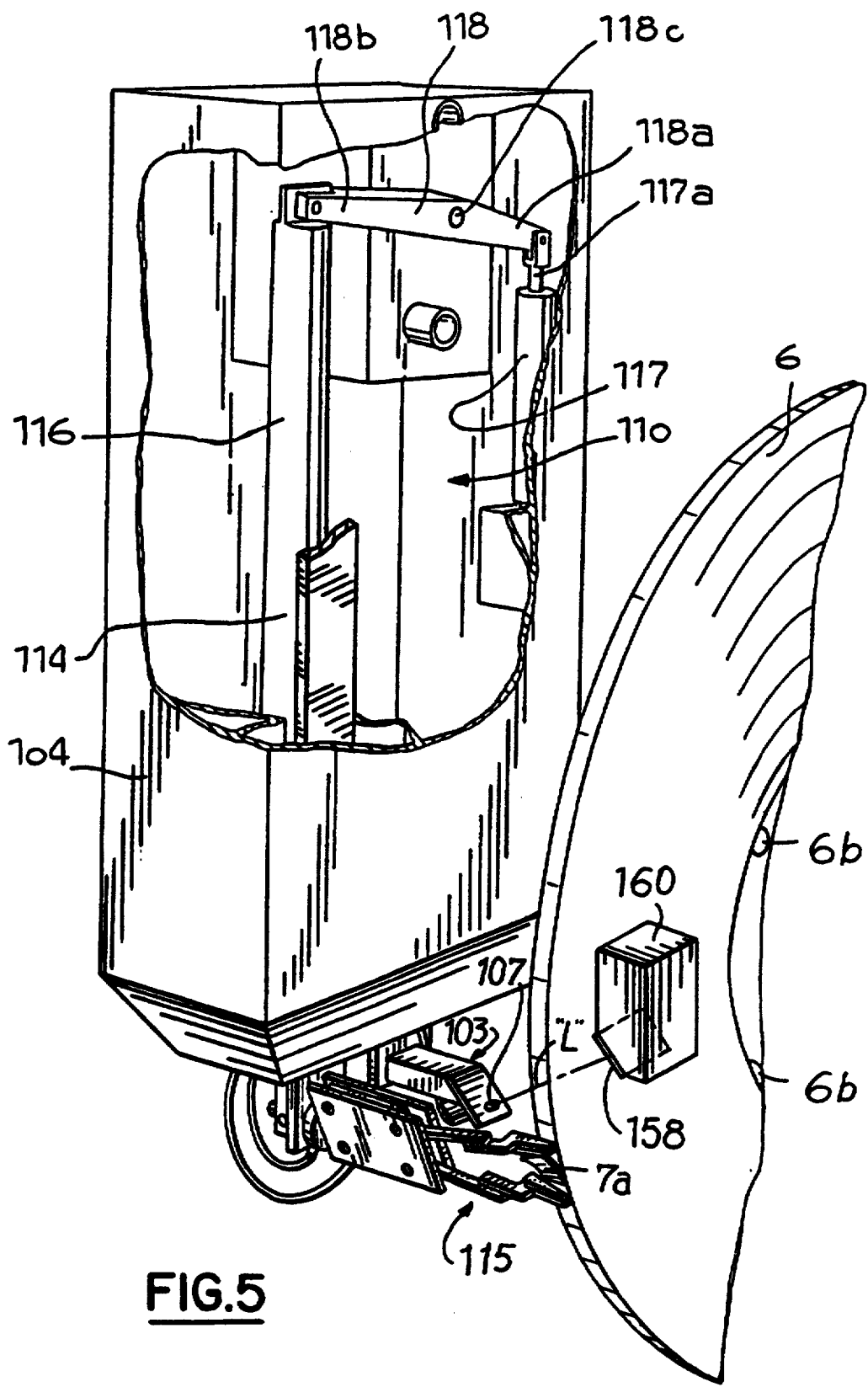
FIG. 5 is a perspective view of the search means and setup means of the present invention associated with the manipulating unit shown in FIG. 3.

Referring to FIG. 5, the setup means comprises a driving bar 114 located in support arm 104 and slidably guided through a number of rollers 113 in a vertical direction. At the lower end 114a of the driving bar 114, a pair of gripping fingers 115 are connected. The gripping fingers 115, can be moved close to each other to pick up the free end 7a.

The gripping fingers 115 are vertically movable via at least a main fluid-operated actuator 116 operating between the support arm 104 and the driving bar 114. Preferably an additional fluid-operated actuator 117 acting between the support arm 104 and the main actuator 116 is also provided to impart additional vertical movement to the gripping fingers 115 when the driving bar 114 is at its maximum extension. As shown in FIG. 5, the additional actuator 117 acts by its rod 117a, on one end 118a of a rocker lever 118 having its fulcrum at 118c. The opposite end of the rocker lever 118b is secured to the main actuator 116.

Once the free end of tape 102b has been positioned in the predetermined location with the aid of the reading member 103, the gripping fingers 115, kept to their maximum raised position by the main actuator 116 and additional actuator 117, are activated to close and pick up the free end portion 102b.

In order to thread the use tape 7 through the various components of the corresponding module, the gripping fingers 115, upon the command of the main actuator 116 and preferably with the aid of the additional actuator 117, are moved downwardly until the driving bar 114 reaches a position below vacuum column 111 and counter wheel 112.

The main carriage 74 is then moved along the guide bars 75 causing a horizontal displacement of the gripping fingers 115 underneath the vacuum column 111, towards the splicing blocks 36 and 37, thereby threading the tape 7 over the counter wheel 112.

During the horizontal movement of the gripping fingers 115, the additional actuator 117 is operated in order to slightly raise the gripping fingers 115 and enable them to ride over the splicing blocks 36 and 37. When the gripping fingers 115 have moved past the blocks 36 and 37, additional actuator 117 lowers them again to lay the tape 7 onto the appropriate grooves of the blocks.

The gripping fingers 115 are opened and the free end of tape 102b is released. (It is held in the grooves of the blocks by vacuum). Then the actuator 105 drives the support arm 104 away from the pancake 6 and the main and additional actuators 116 and 117 respectively, bringing the gripping fingers 115 back to the starting position. Simultaneously, the main carriage 74 moves backward along the guide bars 75 to bring the manipulating unit 45 back in front of the storage unit 46.

The tape 7 is thereafter engaged by winding member 122 associated with the windoff/positioning assembly 216 which is designed to wind off (waste) a predetermined amount of tape 7.

The cassette loading apparatus described herein has a productivity which is at least comparable to that of four separate prior art loading machines, although the size and bulkiness of the apparatus is considerably less than four machines acting independently of one another. Furthermore, the enclosure of the loading modules 2 and pancake magazine 46 behind doors (e.g. glass doors) can create a clean room environment within each multiple module cassette loading apparatus 1. This can substantially reduce costs of a loading operation from those associated with the employment of a full clean room environment.

In sum, the complete automation of the loading operation of the present invention makes the system self-contained. No manual intervention is required to supply the cassettes to be loaded, remove the loaded cassettes and replace pancakes on the support hubs.

It will be recognized that although the tape loading system and apparatus described herein includes four loading modules, any number of loading modules can be used depending upon the level of productivity desired.

Although the present invention has been described with reference to a specific embodiment, neither the specifically described method of operation, nor the specific structure described should be construed as limiting since the disclosed embodiment is merely illustrative of the invention. One of skill in the art may alter the described embodiment without departing from the spirit or scope of the invention.

I claim:

1. A tape loading apparatus comprising:
   supply conveyor means for automatically transporting empty cassettes to a plurality of independently operating tape loading modules, wherein each loading module is associated with at least one support hub for rotatably supporting a reel of use tape, and wherein each loading module comprises a loading station for filling said empty cassettes with use tape from a reel of use tape mounted on said at least one associated support hub;
   reel magazine means for storing a plurality of filled reels of use tape wherein each reel is selectively picked up from said magazine means by reel changer means, said reel changer means comprising a movably mounted manipulating means for automatically and selectively removing empty reels from any of said plurality of support hubs and automatically and selectively replacing said empty reels with filled reels of use tape picked up from said reel magazine means, to provide a semi-continuous supply of use tape for filling empty cassettes.

2. A method of loading tape into cassettes comprising the steps of:
   storing a plurality of filled reels of use tape in a reel magazine;
   automatically picking up a filled reel of use tape from said reel magazine with a reel transfer device;
   selectively transporting, with said reel transfer device, the filled reel of use tape which has been picked up from said reel magazine to any one of a plurality of rotatable support hubs each associated with a tape loading module and connected to said reel transfer device;

automatically picking up an empty reel of use tape from a selected one of said plurality of support hubs with said reel transfer device and automatically replacing said empty reel of use tape with said filled reel of use tape picked up from said reel magazine using said reel transfer device;

automatically and continuously loading a plurality of cassettes with use tape from said filled reel of use tape picked up from said reel magazine with at least one of said plurality of loading modules; and transferring loaded cassettes to a discharge conveyor for transport away from said at least one loading module.

* * * * *